United States Patent [19]

Pierce, Jr. et al.

[11] Patent Number: 4,800,503
[45] Date of Patent: Jan. 24, 1989

[54] METHOD AND APPARATUS FOR GRADING FABRICS

[75] Inventors: James M. Pierce, Jr., Greensboro; Jerry F. Mallard, High Point, both of N.C.

[73] Assignee: Burlington Industries, Inc., Greensboro, N.C.

[21] Appl. No.: 909,222

[22] Filed: Sep. 19, 1986

[51] Int. Cl.$^4$ .............. G06F 15/46; G06F 9/00; D06H 3/02; G10L 9/00
[52] U.S. Cl. .............................. 364/470; 26/70; 381/43; 364/552
[58] Field of Search ............... 381/43, 42; 364/513.5, 364/470, 471, 552; 28/299; 26/70; 250/559; 73/159

[56] References Cited

U.S. PATENT DOCUMENTS

| | | | |
|---|---|---|---|
| 2,930,228 | 3/1960 | Lawrence et al. | 26/70 |
| 3,094,368 | 6/1963 | Peck | 26/70 |
| 3,633,211 | 1/1972 | Batzdorff | 26/70 |
| 3,900,265 | 8/1975 | Merlen et al. | 356/431 |
| 3,946,157 | 3/1976 | Dreyfus | 381/43 |
| 3,962,730 | 6/1976 | Robinson | 26/70 |
| 4,277,644 | 7/1981 | Levinson et al. | 381/43 |
| 4,344,146 | 8/1982 | Davis, Jr. et al. | 364/552 |
| 4,348,550 | 9/1982 | Pirz et al. | 379/357 |
| 4,372,499 | 2/1983 | Bächinger | 242/50 |
| 4,401,852 | 8/1983 | Noso et al. | 367/198 |
| 4,435,617 | 3/1984 | Griggs | 381/44 |
| 4,462,080 | 7/1984 | Johnstone et al. | 364/513.5 |
| 4,481,507 | 11/1984 | Takiguchi et al. | 364/470 |
| 4,498,078 | 2/1985 | Yoshimura et al. | 340/679 |
| 4,583,181 | 4/1986 | Gerber et al. | 364/470 |
| 4,641,292 | 2/1987 | Tunnell et al. | 381/41 |

OTHER PUBLICATIONS

Publication entitled "The Burlington Look", dated Feb. 1985, vol. 10, No. 3.
Advertisement from Textile World Magazine, page 66, 11/84.
Texas Instruments Pamphlet "Speech Command System", 12/83.
Texas Instruments Pamphlet "Professional Computers (makes the best software perform even better)", 4/84.
Texas Instruments Pamphlet "Professional Computers", (for superior, dependable performance.), 12/83.

Primary Examiner—P. S. Lall
Assistant Examiner—Steven Melnick
Attorney, Agent, or Firm—Cushman, Darby & Cushman

[57] ABSTRACT

A fabric grading method and system includes a computer and speech command system for converting oral commands spoken by an operator to signals for driving an inspection frame and a defect labeling device. The operator's spoken defect descriptions are automatically recorded and discriminated so that the defect labeler is only driven in response to detected major defects. The system also receives and records width and pick per inch measuring data for the fabric being inspected.

25 Claims, 2 Drawing Sheets

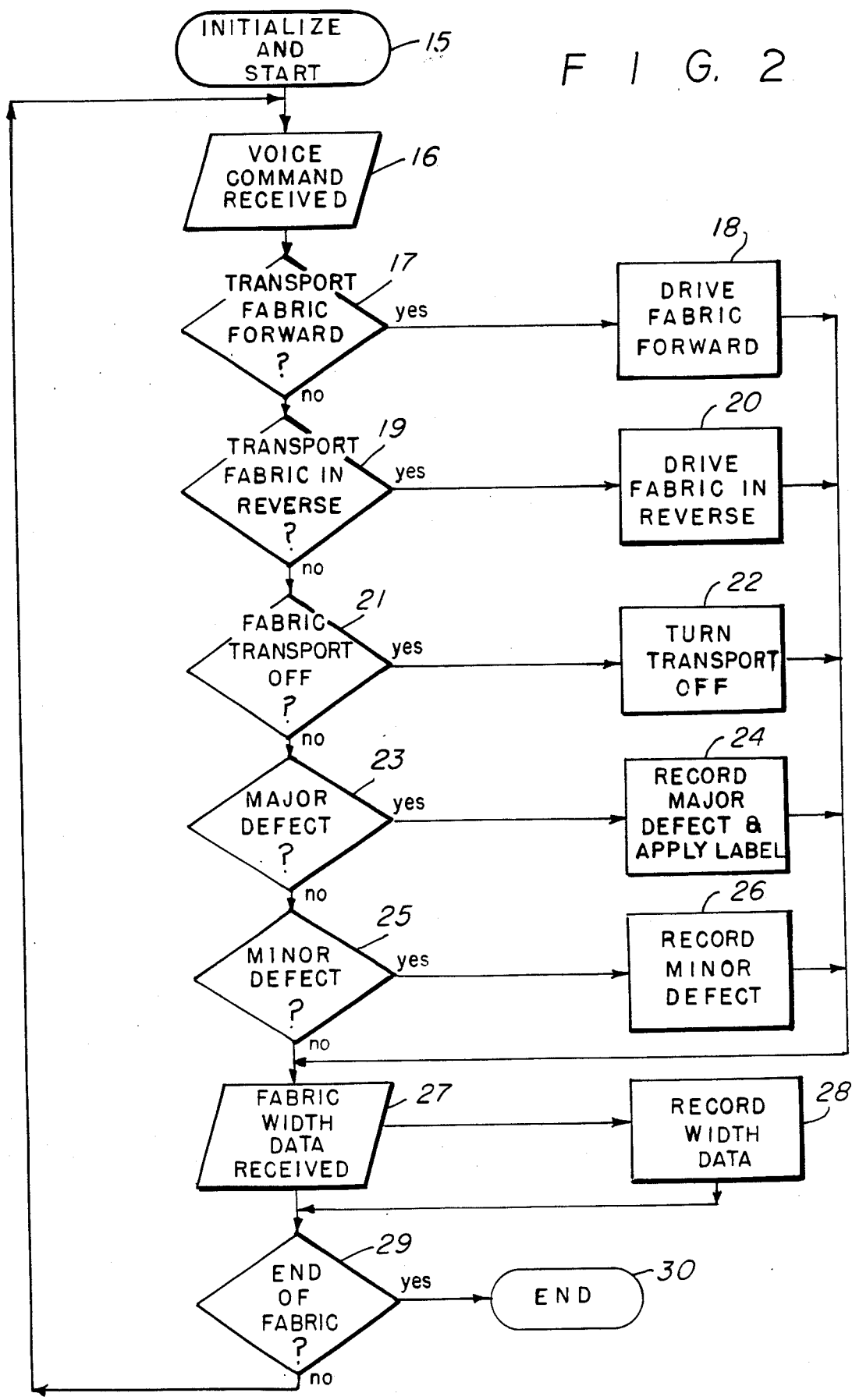

METHOD AND APPARATUS FOR GRADING FABRICS

FIELD OF THE INVENTION

The invention is directed to a method and apparatus for grading various types of fabrics. More particularly, the invention pertains to a voice activated method and apparatus for recording and labeling major and minor defects in a fabric and includes the control of a frame for facilitating the grading of the fabric and the recording and monitoring of characteristics of the fabric such as the fabric's width.

BACKGROUND OF THE INVENTION

In conventional fabric grading systems it has been traditional for fabric inspectors to grade fabric by looking over the entire area of a roll of fabric and if defects are detected recording them by type, severity and location and where possible mending the fabric to eliminate or mitigate the defect. This has typically been accomplished by an operator using pencil and paper to record defects and needle and thread, tweezers or other suitable implements to correct defects. An inspection frame, manually controlled by the operator, is used to transport the fabric being inspected. Accordingly, the process of grading a fabric has been cumbersome, time consuming, inefficient and occassionally inaccurate.

Although voice control systems for operating machinery have been known in the prior art (i.e., see U.S. Pat. Nos. 3,946,157; 4,348,550; 4,401,852; and 4,435,617 to Dreyfus, Noso et al, Pirz et al and Griggs, respectively) the assignee of this invention first proposed an automated system for grading fabrics using a computer equipped with a speech command system so that inspectors could verbally record defects that are detected, while their hands were free of pencil and paper so that mending of the fabric could be facilitated wherever possible. This automated system greatly increased productivity. The system further provided report generation capabilities in that stored data could be printed out to provide reports of problems with weavers, looms or the like as well as providing final grade information for the product that was to be sold.

While the above described automated system was a significant advance over conventional grading systems, it still required the operator to manually operate the frame which transported the fabric being inspected and it did not discriminate between major and minor defects, the latter of which could be mended during the inspection operation and the former of which had to be located subsequently by searching the roll of fabric so that more intensive corrections or outright removal of the defective portion of the fabric could be accomplished.

SUMMARY OF THE INVENTION

The present invention overcomes the above described difficulties associated with the prior grading systems. More specifically, the present invention allows the fabric being inspected to be transported in forward or reverse directions in accordance with a verbal command from the operator. Thus, the operator is completely free from manipulation of control levers, buttons or the like during the inspection operation.

Further, the present invention discriminates between minor and major defects and applies a metallic label to the fabric upon each discriminated major defect. That is, the system recognizes the type of defect that the operator has called out and if it recognizes the defect as a major defect, rather than a minor defect, a metallic label is applied in close proximity to the defect (i.e., at an edge of the fabric adjacent to the defect). The metallic labels include pressure sensitive adhesive on their back side and their metallic composition allows the labels to be found with magnetic sensing means. Furthermore, the system is able to discriminate between major defects and apply color coded or otherwise identifiable metallic labels in accordance with the type of discriminated major defect.

In addition, the present invention also incorporates a width monitoring system, the output of which is applied via an RS 232 output port to the system computer so that width data can be continuously monitored and recorded along with the type and location of the defects called into the system by the operator. Alternatively, the width monitoring system can be operated so as to only record in memory the minimum width encountered during inspection of the fabric.

As mentioned above, the operator is able to verbally control the transport of the fabric to be inspected. Thus, by simple verbal commands such as "forward", "reverse" and "stop frame" the operator's voice is recognized by the computer which in turn outputs controls to the frame's fabric motor drive. The computer can be programmed such that the reverse motion only runs for about three yards, since typically that is all that an operator would want to back up the fabric. The operator could of course activate another or series of three yard reverse movements by calling out the "reverse" command additional time(s).

BRIEF DESCRIPTION OF THE DRAWINGS

FIG. 2 shows a flow chart describing typical operation of the present invention.

DETAILED DESCRIPTION OF THE PRESENT INVENTION

Figure 1:
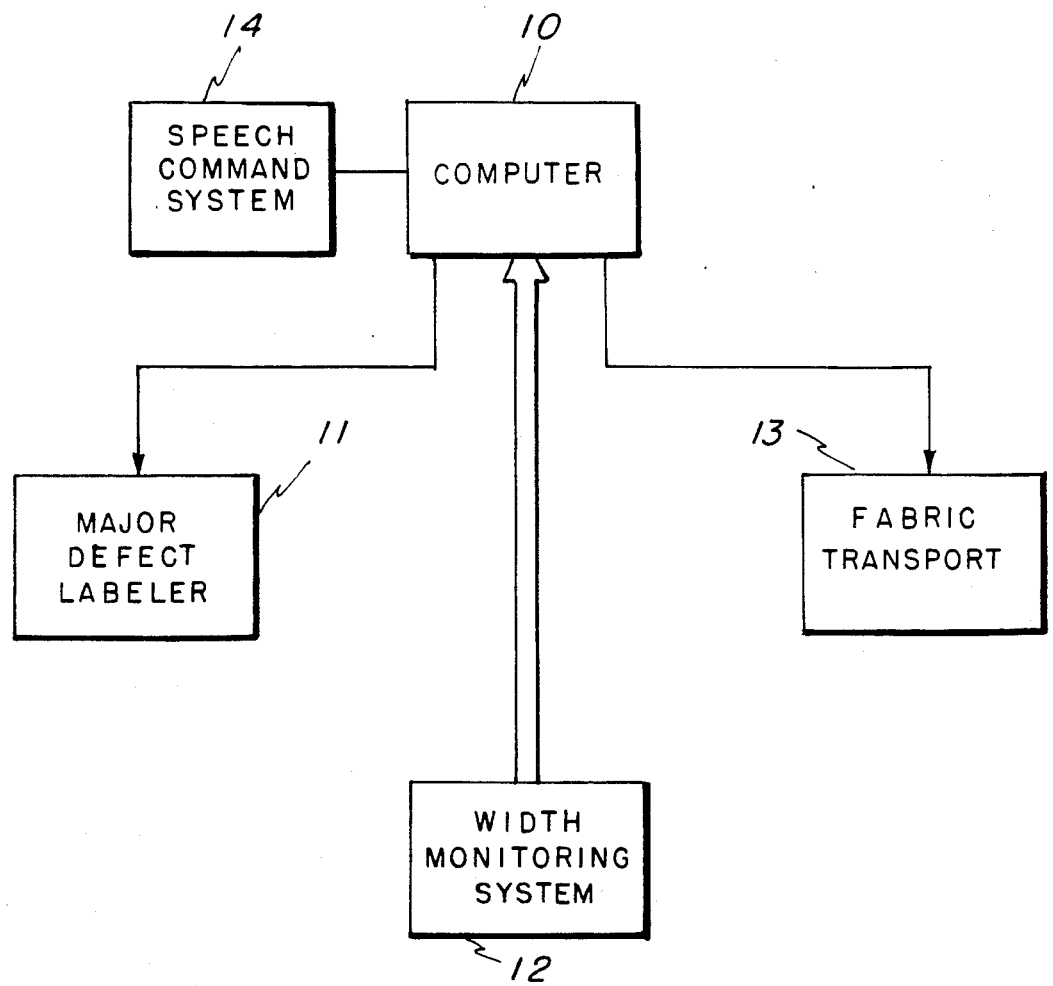
FIG. 1 shows an exemplary block diagram of the fabric grading system according to the present invention.

FIG. 1 shows in block diagram form the fabric grading system according to the present invention. A computer 10 (for example a Texas Instruments "Business Pro" computer) is connected to major defect labeler 11 (for example Joseph Pernick Manufacturing Corp. model 075-14), to a width monitoring system 12 (for example Systronics model WIS-200), and a fabric transporter 13 (for example an Alexander inspection frame), and includes a speech command system 14 (for example a TI speech command system plug-in card to the aforementioned computer). Speech command system 14 together with computer 10 converts verbal commands from the operator to specific control signals for driving major defect labeler 11 or fabric transport 13.

For example, if the fabric being inspected is a glass fabric to be used for a printed circuit board and the inspector detects a large carbon build up on the fabric a pre-determined verbal command such as "carbon" would be spoken by the operator. The spoken term "carbon" would then be discriminated by the speech command system 14 and computer 10 so as to control major defect labeler 11 to apply a label to the edge of the fabric adjacent to the location of the carbon build up. The major defect, i.e., the carbon build up would also be recorded into the computer memory by location within the fabric roll.

On the other hand, if the fabric being inspected is a glass fabric to be used in an air filtration system, then a carbon build up would not constitute a major defect. Accordingly, the computer would be pre-programmed so that when the operator spoke the command "carbon" the command would be discriminated as a minor defect and thus would only be recorded into the computer memory. The operator would be free to attempt removal of the carbon deposit or take any other suitable action during the inspection mode, but the system would not enable the major defect labeler to apply a label on the edge of the fabric adjacent to the carbon build up, since a more drastic follow up corrective action would not be necessary.

Similarly, the speech command system 14 and computer 10 discriminate a verbal command from the operator which pertains to fabric transport. Depending on the discriminated command the fabric transport 13 will either drive the fabric in the forward or reverse directions or be disabled.

As the fabric is being inspected, the width monitoring system 12 measures the width of the fabric and provides width data to the computer for recordation. In addition the operator may verbally record other characteristics of the fabric such as, for example, picks per inch.

The operation of the present invention will now be described with reference to FIG. 2. In FIG. 2 there is a first initialization and start step 15, in which the computer memory or an area of the computer memory is cleared and identifying input data is then stored therein. For example, header information for the hard copy output reports can be set into the memory or modified from that already pre-programmed into the computer and specific information with respect to the fabric to be inspected can be input such as the style, warp, cut, lot and loom from which the fabric was obtained. Furthermore, it can also be determined at this time whether the fabric which is being inspected has already been partially inspected or whether this is a new run of fabric for which inspection is yet to commence. Other information which may be beneficial for assessing the production run of the fabric might include the weaver or weavers who were responsible for the fabric, i.e., those persons responsible for the operation of the loom from which the fabric was obtained.

In a second step 16 the system receives a voice command from the operator. Thereafter, in step 17 the system determines whether the voice command received requires the fabric to be transported in the forward direction. If the answer in step 17 is yes then the fabric is driven forward, i.e., by providing a drive signal to the frame for activating the frame transport in the forward direction, as shown in step 18.

If the answer in step 17 is no then the system determines whether the fabric transport is to be driven in the reverse direction in step 19. Similarly, if the answer to step 19 is yes then the frame is driven so the fabric is driven in the reverse direction, as shown in step 20. If, however the answer is no in step 19 then the system determines whether the fabric transport is to be turned off or disabled in step 21. If the answer is yes then the framer is turned off in step 22.

If, however, the answer in step 21 is no then the system determines whether the voice command received is indicative of a major defect in step 23. If the answer in step 23 is yes, then in step 24 the system records the major defect and drives the defect label device to apply a label to the fabric. If, however, the answer in step 23 was no then the system goes on in step 25 to determine if the voice command received is indicative of a minor defect. If the answer in step 25 is yes, then the system in step 26 records the minor defect.

If, however, the answer in step 25 was no then the system in step 27 monitors the width measuring device and receives fabric width data which is recorded in step 28. It should also be noted that after the activities in steps 18, 20, 22, 24 and 26 are carried out the system accepts the fabric width data in step 27.

After recording of the fabric width data in step 28 or if no fabric width data is received for recording, the system moves on to decision step 29 where it is decided if the end of the fabric to be inspected has been reached. If so, the system moves on to an end statement 30, where the operator can verbally call for the hard copy data report of the defects recorded. If the decision in 29 is no, however, then the system returns to step 16 to receive a subsequent voice command.

As will be appreciated by those skilled in the art, the above described description of the operation of the system can be modified in any number of ways, for example, to provide summary reports at any time or immediately at the end of a run of fabric. Also, additional data can be spoken by the operator for recordation into the system, for example, measurement of the picks per inch can be carried out by the operator and the resulting measurement verbally spoken by the operator for recordation. In addition, often times it is the case where a defect in the fabric continues for some length of the fabric, i.e., a running defect, and it is therefore desirable for the operator to indicate the onset of the defect and to then indicate to the system at some later time that the defect has ended. In this way, the system keeps track of the length of the defect along the length of the inspected fabric and can issue a defect report which indicates the length and duration of the detected defect.

In addition, the system can be pre-programmed so as to calculate the number of defects called out by the operator per hundred yards (or any other reference measure of fabric), in order to determine the quality and grade of the fabric being inspected. Thus a hard copy report output by the system can provide data listing the defects by number and type, defects by yard or other suitable reference measure, the number of defects per weaver shift, loom yards, and grader or operator. The ability to obtain data such as that described above in a timely and efficient manner, by use of the present invention, has significant advantages in improving productivity and efficiency.

Furthermore, the scheme of operation whereby the operator or grader is allowed to correct minor defects while inspecting the fabric and major defects are identified by metallic labels for further action also greatly increases production and efficiency. Significant advantages are provided by freeing the operator or grader from having to manually control the frame and manually record the minor and major defects on pencil and paper.

The above described invention has application for a number of various types and styles of fabric, including glass fabric, used in printed circuit boards or air filtration systems, fabric used for men's and woman's apparel, carpeting and the like. Although only one examplery embodiment has been described in detail above, those skilled in the art will appreciate that many variations and modifications may be made to the examplory embodiment without departing from the novel and advantageous features of the present invention. Moreover, the present invention is by no means limited to the particular components described above, but rather, could be implemented in a variety of other ways. Accordingly, all such variations and modifications are intended to be included within the scope of the appended claims.

What is claimed is:

1. A fabric grading system for grading a fabric, said system comprising:
   fabric transport means for transporting the fabric in at least one direction in response to at least one transport signal;
   defect labeling means for applying a defect label to the fabric in response to a defect signal; and
   control means for controlling said fabric transport means by outputting said at least one transport signal in accordance with predetermined verbal commands issued by an operator, for controlling said defect labeling means by outputting said defect signal in response to a predetermined verbal command issued by the operator, and for receiving and recording fabric defect data verbally issued by the operator.

2. The system as claimed in claim 1, said defect label being metallic and being applied to one edge of the fabric adjacent to an observed defect.

3. The system as claimed in claim 1, said control means also being provided for recording the number of picks per inch in the fabric input verbally by the operator.

4. The system as claimed in claim 1, said control means being provided for recording all defects called out by the operator and for causing said defect labeling means to selectively apply labels to the fabric only in response to selected ones of the defects called out by the operator.

5. The system as claimed in claim 1, said control means being provided for collecting and outputting in hand copy form said recorded fabric defect data and data input to said system by the operator.

6. The system as claimed in claim 1, said fabric being any one of glass fabric, carpeting or cloth.

7. A fabric grading system comprising:
   verbal command discriminating and control means for discriminating verbal commands from an operator as any one of major fabric defect, minor fabric defect, fabric transport-off, fabric transport forward and fabric transport reverse commands, and for recording the major and minor fabric defect commands;
   defect labeling means for applying a defect label to the fabric in response to said control means discriminating a major defect verbal command from the operator;
   fabric transport means for transporting the fabric in a forward direction in response to said control means discriminating a forward verbal command from the operator, for transporting the fabric in a reverse direction in response to said control means discriminating a reverse verbal command from the operator and for disabling said fabric transport means in response to said control means discriminating a fabric transport-off verbal command from the operator.

8. The system as claimed in claim 7, said defect label being metallic and being applied to one edge of the fabric adjacent to an observed defect.

9. The system as claimed in claim 7, said control means also being provided for recording the number of picks per inch in the fabric input verbally by the operator.

10. The system as claimed in claim 7, said means being provided for collecting and outputting in hand copy form said recorded fabric defect data and identifying data input to said system by the operator.

11. The system as claimed in claim 7, said fabric being any one of glass fabric, carpeting or cloth.

12. A fabric grading system for grading a fabric, said system comprising:
    width monitoring means for monitoring the width of a fabric to be graded and for outputting fabric width data;
    fabric transport means for transporting the fabric in at least one direction in response to at least one transport signal;
    defect labeling means for applying a defect label to the fabric in response to a defect signal; and
    control means for controlling said fabric transport means by outputting said at least one transport signal in accordance with predetermined verbal commands issued by an operator, for controlling said defect labeling means by outputting said defect signal in response to a predetermined verbal command issued by the operator, and for receiving and recording fabric defect data verbally issued by the operator and fabric width data received from said width monitoring means.

13. The system as claimed in claim 12, said defect label being metallic and being applied to one edge of the fabric adjacent to an observed defect.

14. The system as claimed in claim 12, said control means also being provided for recording the number of picks per inch in the fabric input verbally by the operator.

15. The system as claimed in claim 12, said control means being provided for recording all defects called out by the operator and for causing said defect labeling means to selectively apply labels to the fabric only in response to a portion of the defects called out by the operator.

16. The system as claimed in claim 12, said control means being provided for collecting and outputting said recorded fabric defect data and identifying data input to said system by the operator.

17. The system as claimed in claim 12, said fabric being any one of glass fabric, carpeting or cloth.

18. A fabric grading system comprising:
    width monitoring means for monitoring the width of a fabric to be graded and for outputting fabric width data;
    verbal command discriminating and control means for discriminating verbal commands from an operator as any one of major fabric defect, minor fabric defect, fabric transport-off, fabric transport forward and fabric transport reverse commands, for receiving and recording the fabric width data outputted from said width monitoring means and for recording the major and minor fabric defect commands;
    defect labeling means for applying a defect label to the fabric in response to said control means discriminating a major defect verbal command from the operator;

fabric transport means for transporting the fabric in a forward direction in response to said control means discriminating a forward verbal command from the operator, for transporting the fabric in a reverse direction in response to said control means discriminating a reverse verbal command from the operator and for disabling said fabric transport means in response to said control means discriminating fabric transport-off verbal command from the operator.

19. The system as claimed in claim 18, said defect label being metallic and being applied to one edge of the fabric adjacent to an observed defect.

20. The system as claimed in claim 18, said control means also being provided for recording the number of picks per inch in the fabric input verbally by the operator.

21. The system as claimed in claim 18, said control means being provided for collecting and outputting in hand copy form said recorded fabric defect data and identifying data input to said system by the operator.

22. The system as claimed in claim 18, said fabric being any one of glass fabric, carpeting or cloth.

23. A method of grading fabric comprising the steps of:

transporting fabric to be inspected in at least one direction in accordance with verbal commands spoken by an operator;

recording defects identified by the operator in accordance with verbal defect descriptions spoken by the operator;

discriminating said defects into at least major and minor categories in accordance with the verbal defect descriptions spoken by the operator; and applying a defect label to the inspected fabric for each discriminated major defect.

24. The method as in claim 23 further comprising the step of measuring and recording the width of the fabric being inspected.

25. The method as in claim 24 wherein said measuring and recording step includes recording the operator's verbal input of the number of picks per inch in the fabric being inspected.

* * * * *